United States Patent
Horlock

(10) Patent No.: US 10,230,126 B2
(45) Date of Patent: Mar. 12, 2019

(54) FUEL CELL STACK ASSEMBLY

(71) Applicant: INTELLIGENT ENERGY LIMITED, Loughborough (GB)

(72) Inventor: Mark Phillip Horlock, Loughborough (GB)

(73) Assignee: INTELLIGENT ENERGY LIMITED, Loughborough (GB)

( * ) Notice: Subject to any disclaimer, the term of this patent is extended or adjusted under 35 U.S.C. 154(b) by 519 days.

(21) Appl. No.: 14/905,674

(22) PCT Filed: Jul. 17, 2014

(86) PCT No.: PCT/GB2014/052190
§ 371 (c)(1),
(2) Date: Jan. 15, 2016

(87) PCT Pub. No.: WO2015/008078
PCT Pub. Date: Jan. 22, 2015

(65) Prior Publication Data
US 2016/0172703 A1 Jun. 16, 2016

(30) Foreign Application Priority Data

Jul. 17, 2013 (GB) .................................. 1312767.5

(51) Int. Cl.
| | |
|---|---|
| *H01M 8/248* | (2016.01) |
| *H01M 8/2457* | (2016.01) |
| *H01M 8/2484* | (2016.01) |
| *H01M 8/241* | (2016.01) |
| *H01M 8/2485* | (2016.01) |
| *H01M 8/04089* | (2016.01) |

(Continued)

(52) U.S. Cl.
CPC ....... *H01M 8/248* (2013.01); *H01M 8/04089* (2013.01); *H01M 8/04201* (2013.01); *H01M 8/2415* (2013.01); *H01M 8/2457* (2016.02); *H01M 8/2484* (2016.02); *H01M 8/2485* (2013.01); *H01M 2008/1095* (2013.01)

(58) Field of Classification Search
None
See application file for complete search history.

(56) References Cited

U.S. PATENT DOCUMENTS

| | | | |
|---|---|---|---|
| 5,543,241 A | * | 8/1996 | Nishioka ............. H01M 8/0271 429/458 |
| 6,087,033 A | | 7/2000 | Grune et al. |
| 2008/0020260 A1 | | 1/2008 | Brydon et al. |

(Continued)

OTHER PUBLICATIONS

International Search Report and Written Opinion dated Oct. 16, 2014 in International Application No. PCT/GB2014/052190.

*Primary Examiner* — Rena Dye Cronin
(74) *Attorney, Agent, or Firm* — Baker & Hostetler LLP

(57) ABSTRACT

A fuel cell stack assembly (101) comprising a fuel cell stack (102) comprising one or more fuel cells and a retaining member (100) comprising a first engaging region (104) that engages a first end face (110) of the fuel cell stack (102), a second engaging region (106) that engages a second opposing end face (112) of the fuel cell stack (102, and a joining region (108) configured to bias the first engaging region (104) towards the second engaging region (106). The retaining member (106) defines a fluid chamber (118) for communicating a fluid to or from the fuel cell stack (102).

19 Claims, 6 Drawing Sheets

(51) Int. Cl.
*H01M 8/04082* (2016.01)
*H01M 8/1018* (2016.01)

(56) References Cited

U.S. PATENT DOCUMENTS

| | | | | |
|---|---|---|---|---|
| 2009/0220848 A1* | 9/2009 | Yang | ............... | H01M 8/0204 |
| | | | | 429/444 |
| 2010/0159345 A1 | 6/2010 | Shibata et al. | | |
| 2010/0173218 A1 | 7/2010 | Kozu et al. | | |
| 2011/0123888 A1 | 5/2011 | Kozu et al. | | |
| 2011/0294030 A1* | 12/2011 | Yamamoto | ............ | H01M 8/247 |
| | | | | 429/465 |
| 2015/0333356 A1* | 11/2015 | Horlock | ............... | H01M 8/247 |
| | | | | 429/469 |
| 2015/0340722 A1* | 11/2015 | Horlock | ............... | H01M 8/247 |
| | | | | 429/469 |

* cited by examiner

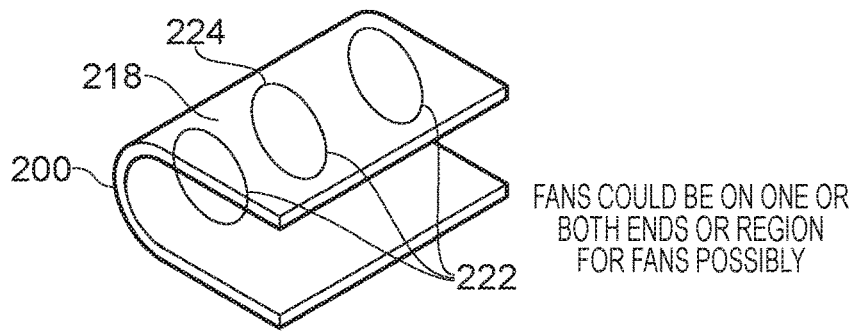
FANS COULD BE ON ONE OR BOTH ENDS OR REGION FOR FANS POSSIBLY
FIG. 2
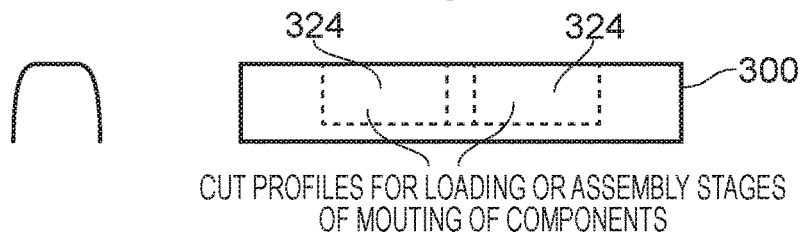
CUT PROFILES FOR LOADING OR ASSEMBLY STAGES OF MOUTING OF COMPONENTS
FIG. 3
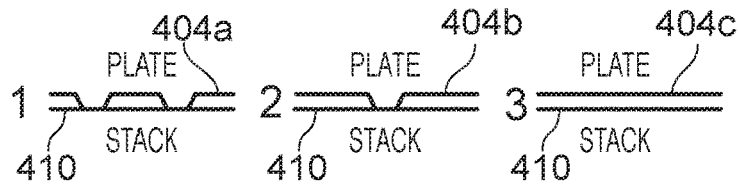
FIG. 4
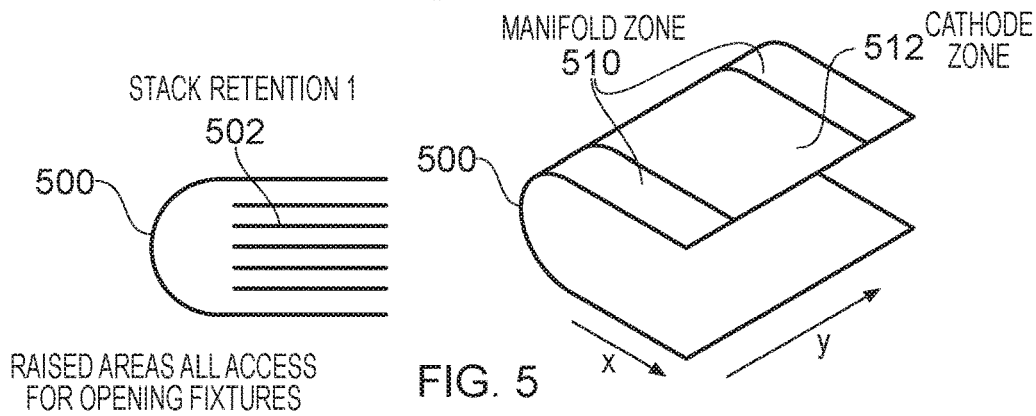
RAISED AREAS ALL ACCESS FOR OPENING FIXTURES
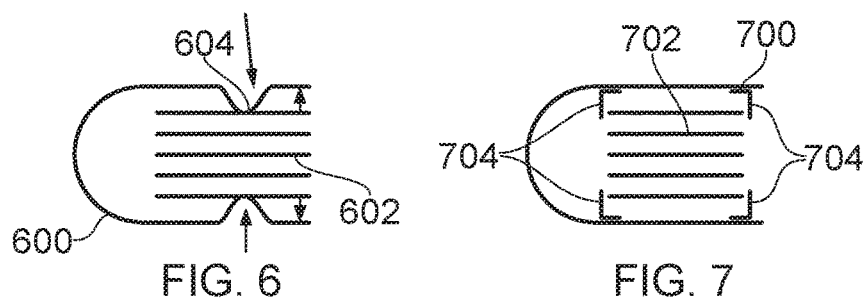
FIG. 6   FIG. 7

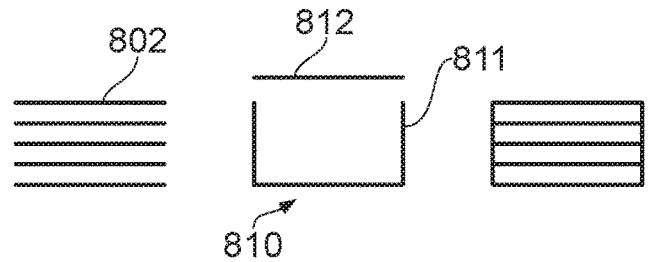
FIG. 8
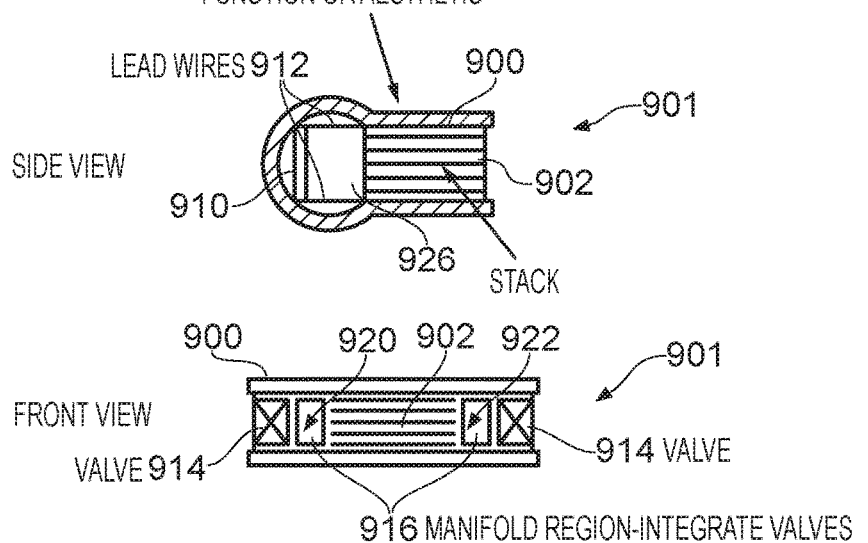
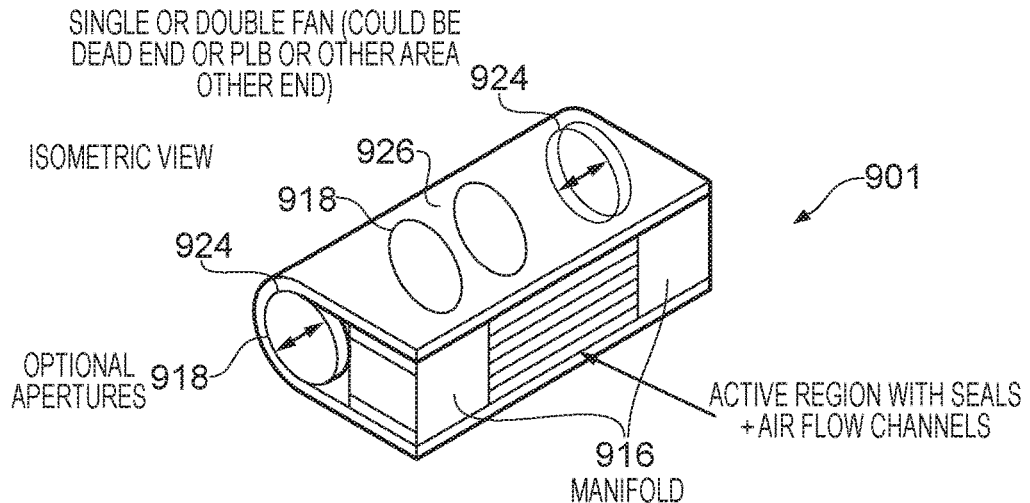
FIG. 9

FUEL CELL STACK ASSEMBLY

CROSS-REFERENCE TO RELATED APPLICATIONS

This application is a National Stage of International Patent Application No. PCT/GB2014/052190, filed Jul. 17, 2014, and claims priority to foreign application GB 1312767.5, filed Jul. 17, 2013, the contents of which are incorporated herein by reference in their entirety.

The present disclosure relates to fuel cell stack assemblies, and methods of assembling fuel cell stack assemblies.

Conventional electrochemical fuel cells convert fuel and oxidant, generally both in the form of gaseous streams, into electrical energy and a reaction product. A common type of electrochemical fuel cell for reacting hydrogen and oxygen comprises a polymeric ion (proton) transfer membrane, with fuel and air being passed over respective sides of the membrane. Protons (that is, hydrogen ions) are conducted through the membrane, balanced by electrons conducted through a circuit connecting the anode and cathode of the fuel cell. To increase the available voltage, a stack may be formed comprising a number of such membranes arranged with separate anode and cathode fluid flow paths. Such a stack is typically in the form of a block comprising numerous individual fuel cell plates held together by end plates at either end of the stack.

Because the reaction of fuel and oxidant generates heat as well as electrical power, a fuel cell stack requires cooling once an operating temperature has been reached. Cooling may be achieved by forcing air through the cathode fluid flow paths. In an open cathode stack, the oxidant flow path and the coolant path are the same, that is, forcing air through the stack both supplies oxidant to the cathodes and cools the stack.

In accordance with a first aspect of the invention there is provided a fuel cell stack assembly comprising:
  a fuel cell stack comprising one or more fuel cells; and
  a retaining member comprising:
    a first engaging region that engages a first end face of the fuel cell stack;
    a second engaging region that engages a second opposing end face of the fuel cell stack; and
    a joining region configured to bias the first engaging region towards the second engaging region,
  wherein the retaining member defines a fluid chamber for communicating a fluid to or from the fuel cell stack.

In this way the retaining member can provide a compression force to the fuel cell stack and can also be used for communicating fluid to or from the fuel cell stack, which can reduce the size and/or complexity of the fuel cell stack assembly.

The fluid may be fuel or water.

The retaining member may extend in a direction that is parallel to, or perpendicular to a direction of air flow through the fuel cell stack.

The fluid chamber may be encased within the retaining member. The fluid chamber may comprise a gallery within the retaining member.

The retaining member may define a first fluid chamber for communicating air to or from the fuel cell stack; and a second fluid chamber for communicating fuel to or from the fuel cell stack.

The retaining member may define the first fluid chamber with a ventilation face of the fuel cell stack. The retaining member may define the second fluid chamber with a fuel communication face of the fuel cell stack.

The ventilation face of the fuel cell stack may be transverse to the fuel communication face of the fuel cell stack.

The fuel cell stack assembly may comprise a separation wall to separate the first fluid chamber from the second fluid chamber.

The fuel cell stack assembly may further comprise a fan configured to pressurise or depressurise air within the first fluid chamber and also provide the separation wall to separate the first fluid chamber from the second fluid chamber.

The fuel cell stack assembly may further comprise a valve configured to control hydrogen flow to or from the second fluid chamber.

There may be provided a fuel cell stack assembly comprising:
  a fuel cell stack comprising one or more fuel cells; and
  a retaining member comprising:
    a first engaging region that engages a first end face of the fuel cell stack;
    a second engaging region that engages a second opposing end face of the fuel cell stack; and
    a joining region configured to bias the first engaging region towards the second engaging region,
    wherein the first engaging region and second engaging region extend to or beyond a midpoint of the associated end faces of the fuel cell stack.

The retaining member can deliver a required load profile to the fuel cell stack for a range of geometric values, including any variance in dimensions of the fuel cell stack that may exist due to tolerances in stack manufacture thereby providing good tolerance compliance. This can improve performance of the fuel cell stack and/or reduce the physical volume occupied by a fuel cell stack assembly comprising the retaining member and the fuel cell stack.

The retaining member may be a unitary component, which can reduce the component count of a fuel cell stack assembly, thereby simplifying and reducing the cost of assembly. The first engaging region, second engaging region and joining region may all be made from the same material, which may be a plastic or a metal.

The first engaging region and/or second engaging regions may comprise an end plate of the fuel cell stack. The end plates may be at the ends of the stack such that all fuel cells in the fuel cell stack are between the end plates. The end plates may have features for gas porting, system monitoring attachments or mounting points for system integration. In other examples, the first engaging region and/or second engaging regions may define an outer shell casing for a product that houses the fuel cell stack.

The first engaging region and/or second engaging region may comprise a fluid communication channel configured to provide a fluid to, or receive a fluid from, the fuel cell stack.

The joining region may be configured to at least partly define a fluid chamber with a side face of the fuel cell stack.

The assembly may further comprise a fan configured to provide fluid to, or extract fluid from, the fluid chamber.

The first engaging region, second engaging region and/or the joining region may be configured to provide a uniform or non-uniform loading profile to the first and/or second end faces of the fuel cell stack. The first engaging region, second engaging region and/or the joining region may comprise:
  one or more ribs extending away from an inner surface of the engaging region;
  one or more grooves extending into an inner surface of the engaging region;
  portions with a different thickness/gauge;
  portions of different materials;

portions with different material properties;
one or more apertures; and/or
a deformation pattern.

The size and geometry of the retaining member can also be selected to provide a required loading profile.

The first engaging region and/or the second engaging region may comprise one or more detents configured to retain the fuel cell stack in position relative to the retaining member.

The fuel cell stack assembly may comprise a plurality of retaining members spaced apart along the length of the fuel cell stack.

The longitudinal edges of the first and second engaging regions may be spaced apart from the associated end faces of the stack.

There may be provided a method of assembling a fuel cell stack assembly, the fuel cell stack assembly comprising:
  a fuel cell stack comprising one or more fuel cells, a first end face and an opposing second end face; and
  a retaining member comprising:
    a first engaging region, a second engaging region and a joining region configured to bias the first engaging region towards the second engaging region, the method comprising:
  applying an external force to move the first engaging region away from the second engaging region against the bias applied by the joining region;
  locating the fuel cell stack between the first engaging region and the second engaging region such that the first engaging region and second engaging region extend to or beyond a midpoint of the associated end faces of the fuel cell stack; and
  removing the external force such that the first engaging region and the second engaging region engage the associated end faces of the fuel cell stack.

There may be provided a fuel cell stack assembly comprising:
  a plurality of fuel cells in a stack, the stack defining a first end face and a second end face that are parallel and opposing one another;
  a compression member at each opposing end face of the stack, each compression member having a proximal portion and a distal portion, wherein each compression member defines an engagement surface for receiving a compression force and a compression surface adjacent to and in compressive relationship with a respective one of the first and second end faces;
  a retaining member attached to the first and second compression members to thereby apply the compression force and maintain the fuel cells in the stack under compression;
  wherein at least one of the compression members is shaped such that the compression force applied only to the proximal portion of the engagement surface is distributed uniformly across the compression surface in both the proximal and distal portions.

The retaining member can deliver a required load profile to the fuel cell stack for a range of geometric values, including any variance in dimensions of the fuel cell stack that may exist due to tolerances in stack manufacture thereby providing good tolerance compliance. This can improve performance of the fuel cell stack and/or reduce the physical volume occupied by a fuel cell stack assembly comprising the retaining member and the fuel cell stack.

The at least one of the compression members may comprise a preformed element defining the compression surface. The preformed element may be configured with a predetermined curvature such that the compression surface is a concave surface when the preformed element is not under load whereas, under the application of the compression force to maintain the fuel cells under compression, flexure of the preformed element causes the compression surface to become a substantially planar surface.

The engagement surface of the at least one of the compression members that comprises a preformed element may be configured with a predetermined curvature such that the engagement surface is a convex surface when the preformed element is not under load whereas, under the application of the load to maintain the fuel cells under compression, flexure of the preformed element between elements of the retaining member causes the engagement surface to become a substantially planar surface.

The retaining member may engage the at least one of the compression members that comprises a preformed element at a position that corresponds to a concave portion of the compression surface.

The engagement surface of the at least one of the compression members that comprises a preformed element may be configured with a predetermined curvature such that the engagement surface is a convex surface when the preformed element is not under load whereas, under the application of the compression force to maintain the fuel cells under compression, flexure of the preformed element causes the engagement surface to become a substantially planar surface.

The engagement surface of the at least one of the compression members may be obliquely angled relative to the compression surface.

The at least one of the compression members may be shaped such that, at a contact portion on the engagement surface that receives the compression force, the engagement surface tends towards the compression surface as the two surfaces extend from the proximal portion to the distal portion.

The at least one of the compression members may be shaped such that the distance between the engagement surface and the compression surface is greater in the proximal portion than in the distal portion.

The at least one of the compression members may be wedge-shaped with a thick end closest to the retaining member.

The engagement surface may be defined as a contact portion of the compression member that receives the compression force.

The retaining member may comprise:
  a first engaging region that engages the proximal portion of the first compression member;
  a second engaging region that engages the proximal portion of the second compression member; and
  a joining region configured to bias the first engaging region towards the second engaging region.

The joining region may extend around the outside of the first and second compression members.

The first engaging region may define a first engaging surface and the second engaging may region define a second engaging surface. The first and second engaging regions may be in planes that converge as they extend away from the joining region of the retaining member.

The first engaging region may define a first engaging surface and the second engaging region may define a second engaging surface. The first and second engaging regions may be in planes that diverge as they extend away from the joining region of the retaining member.

It will be appreciated that various optional features disclosed herein can be used with any of the fuel cell stack assemblies disclosed herein.

A description is now given, by way of example only, with reference to the accompanying drawings, in which:

FIG. 2 illustrates a retaining member that partly defines a fluid chamber;

FIG. 3 illustrates a plan view of a retaining member that has two apertures;

FIG. 4 illustrates three examples of engaging regions with different geometries;

FIG. 5 illustrates an end view and an isometric view of a retaining member;

FIG. 6 illustrates a retaining member engaged with a fuel cell stack;

FIG. 7 illustrates another retaining member engaged with a fuel cell stack;

FIG. 8 illustrates a compression case that can be placed around a fuel cell stack;

FIG. 9 illustrates a side view, a front view and an isomeric view of a fuel cell stack assembly;

Figure 1:
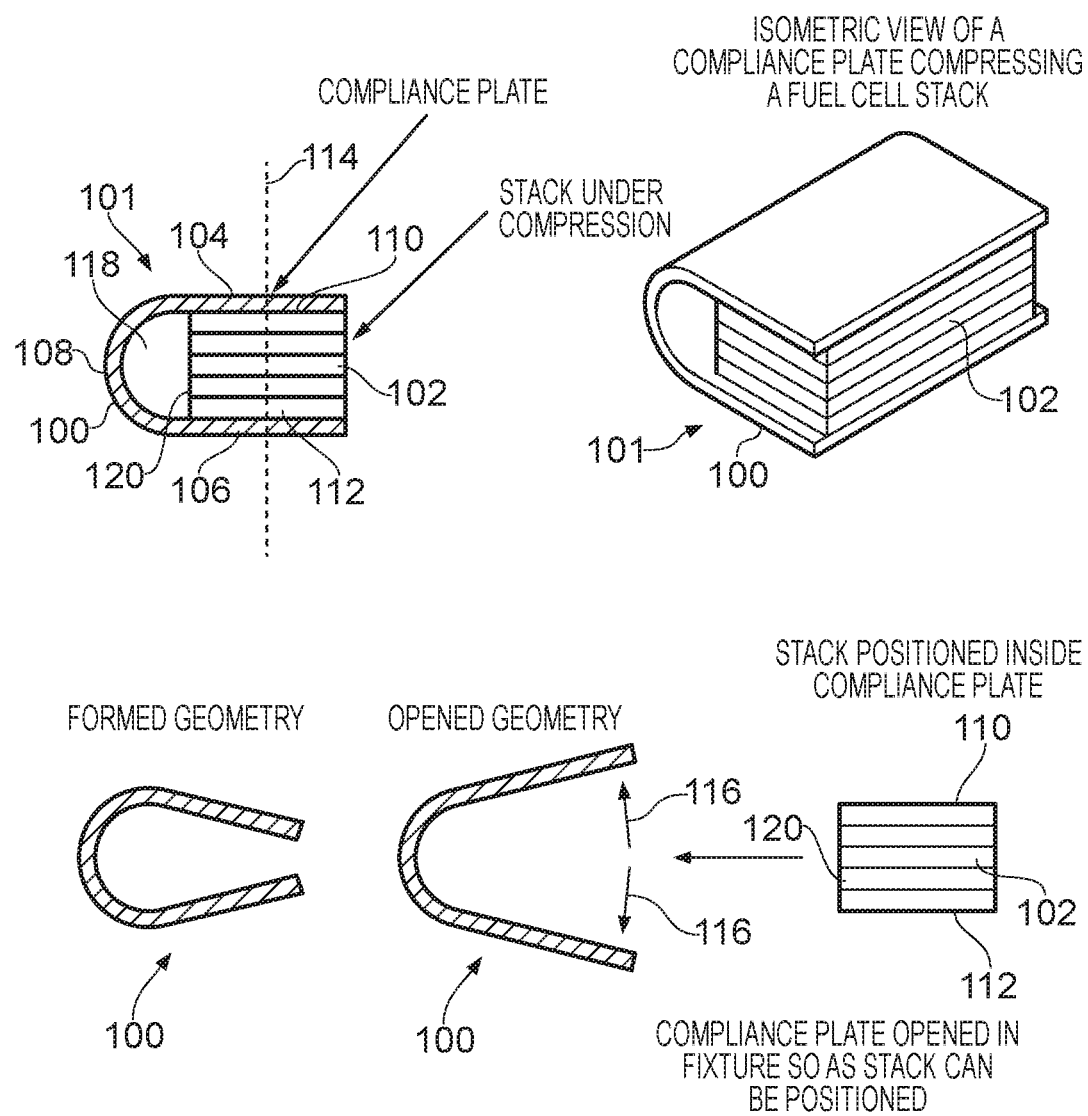
FIG. 1 shows various views of a retaining member and a fuel cell stack.

FIG. 1 shows various views of a retaining member 100 and a fuel cell stack 102. The retaining member 100 and fuel cell stack 102 may together be referred to as a fuel cell stack assembly 101. The retaining member 100 is used to provide a compression force to the fuel cell stack so that it can function correctly. For example, so that any gaskets and seals are subjected to the force necessary for them to prevent leakage of fluid from the fuel cell stack.

The retaining member 100 has a first engaging region 104, a second engaging region 106 and a joining region 108. In this example the retaining member is a unitary, C-shaped component. The two engaging regions 104, 106 define the top and bottom of the 'C' and the joining region 108 defines the side of the C.

In use, the first engaging region 104 engages a first end face 110 of the fuel cell stack 102 and the second engaging region 106 engages a second end face 112 of the fuel cell stack 102. The joining region 108 biases the first engaging region 104 towards the second engaging region 106 when the retaining member 100 is engaged with a fuel cell stack 102 thereby applying a compression force to the fuel cell stack 102. This is shown in the top-left drawing of FIG. 1. The first engaging region 104 and second engaging region 106 extend to or beyond a midpoint 114 of the associated end faces 110, 112 of the fuel cell stack 102. The provision of engaging regions 104, 106 that extend to or beyond the midpoint 114 can enable the load from the retaining member 100 to be evenly spread across the end faces of the fuel cell stack 102.

In this example, the joining portion 108 partly defines a fluid chamber 118 with a side face 120 of the fuel cell stack 102. The fluid chamber 118 is for communicating a fluid to or from the fuel cell stack 102. The side face 120 may be an air inlet face of the fuel cell stack 102. In this example, the fluid chamber 118 extends in a direction that is transverse to the direction of air flow through the fuel cell stack 102. The fluid chamber 118 may be open at each end so that air is readily available to the side face 120 of the fuel cell stack 102. Alternatively, the fluid chamber 118 may be closed at each end by separate components or by additional regions of the retaining member that are not shown in FIG. 1.

The fluid chamber can be used for communicating air, water, or fuel either to or from the fuel cell stack 102.

In other examples, the retaining member may extend in a direction that is parallel to, or perpendicular to a direction of air flow through the fuel cell stack The retaining member 100 enables the volumetric space occupied by the fuel cell assembly 101 to be reduced when compared with the prior art. That is, the product space envelope can be made smaller, which is advantageous in some applications.

FIG. 2 illustrates an example of a retaining member 200 that is to be used with one or more fans to pressurise air in the fluid chamber. A fan 222 may be located at either or both of the open ends of the retaining member 200. Alternatively or additionally an aperture 224 may be provided in the joining region of the retaining member 200. A fan may be associated with the aperture 224 is order to suck or blow air into or out of the fluid chamber 218.

FIG. 3 shows a plan view of a retaining member 300 that has two cut-outs/apertures 324. The apertures 324 may be in either or both an engaging region and a joining region of the retaining member 300. The apertures 324 may be provided to vary the loading across or along the fuel cell stack or for the mounting of external components including the fans that are mentioned above with reference to FIG. 2.

Returning to FIG. 1, the first engaging region 104, joining region 108 and second engaging region 106 are provided by a continuous C-shaped plate of material. For example, a planar plate of material may be moulded or deformed to define the engaging regions 104, 106 and joining region 108. The material may be a plastic or a metal. The joining region 108 can be considered as providing a spring force for maintaining a load between the two engaging regions 104, 106. The two engaging regions 104, 106 exert a force on the fuel cell stack 102 during use in order to retain the stack 102 in position. The simple C-shape can morph into a geometry that suits various applications and fabrication methods.

When the retaining member 100 is not engaged with the fuel cell stack 102 and is at rest (that is, it does not have any external loading forces applied to it) the C-shape is slightly collapsed such that the distance between the first and second engaging regions 104, 106 is less than the thickness of the fuel cell stack 102. This is shown by the bottom-left drawing in FIG. 1.

In order to couple the retaining member 100 to a fuel cell stack 102, an external force 116 is applied to the two engaging regions 104, 106 to move them apart, thereby providing an opening between the two engaging regions 104, 106 through which the fuel cell stack 102 can pass. This is shown by the bottom-right drawing in FIG. 1. The external force 116 can then be removed to engage the retaining member 100 with the fuel cell stack 102. The external force could be applied to the two engaging regions 104, 106 from within the retaining member 100 or may be applied by using magnets to pull the two engaging regions 104, 106 apart (if a material of the two engaging regions 104, 106 is magnetic).

The retaining member 100 provides an effective mechanism for clamping a fuel cell stack together, which can enable fuel cell stacks to be built to a predetermined load.

This can reduce or avoid a requirement for overloading, which may otherwise be the case if the fuel cell stack is built to a predetermined height. The load applied by the retaining member 100 can be set lower than the deformation loading of the fuel cell stack, which can reduce the likelihood that the retaining member 100 damages components in the fuel cell stack. The retaining member 100 can therefore enable a fuel cell stack assembly to be built that is tolerance compliant and capable of delivering the required load profile for a range of geometric values of the fuel cell stack. This can negate or reduce the need for costly tight production controls on component production. Furthermore, the need for secondary components to account for any tolerance in the dimensions of the fuel cell stack can be avoided or reduced. Such secondary components can include rigid end plates that are bolted together, and springs that can accommodate any variations in the dimensions of the fuel cell stack.

The retaining member 100 provides a robust solution to clamping the fuel cell stack which is cost effective and well-suited for volume production. The number of components required to clamp the fuel cell stack may be lower than in the prior art, thereby simplifying construction and creating opportunities to reduce the volumetric requirements for the encapsulation. This can be particularly beneficial as stack geometries get smaller in order to meet product demands.

The retaining members disclosed herein may be particularly suitable for mass production. For example, if the retaining member is made from metal, it could easily be suitable for stamping and forming which is a well known technique for volume production. If the retaining member is made from plastic it could be injection moulded, which is another well known technique for volume production. Furthermore, the retaining member can comprise a combination of injection moulded plastic and stamped metal parts, thereby combining the benefits of both manufacturing processes.

FIG. 4 illustrates three examples of engaging regions 404a, 404b, 404c with different geometries. Also shown adjacent to each engaging region 404a, 404b, 404c is an associated end face 410 of the fuel cell stack.

The first engaging region 404a that is shown has two ribs extending away from the plane of the engaging region 404a. The second engaging region 404b that is shown has one rib extending away from the plane of the engaging region 404b. The third engaging region 404c that is shown is generally planar and has no ribs.

The ribs may extend longitudinally along the length of the engaging region, laterally across the width of the engaging region, or in any other direction. The ribs can apply an increased compressive force to the stack (compared with the compressive forced exerted in between ribs) at specific locations in order to improve the performance of the stack. For example, ribs can be provided in locations that correspond with seals in the fuel cell stack to improve the reliability of the stack.

It will be appreciated that any number of ribs can be provided in any orientation on one or both of the engaging regions.

Providing ribs on the engaging region is one example of a mechanism for providing a non-uniform loading profile across an end face of the stack. This may also be referred to as tuning a loading profile. Other examples that are not necessarily shown in the figures include:

- one or more grooves extending into the plane of the engaging region, thereby reducing the compressive force applied to the stack in the vicinity of the grooves.
- having portions of the engaging region and/or joining region with different respective thicknesses/gauges. A thicker material may be stiffer and therefore provide a larger compressive force than a thinner material.
- having portions of the engaging region and/or joining region made from different respective materials. Use of materials with different strengths and other physical parameters in the various portions can be used to tune a loading profile that is applied to the fuel cell stack.
- one or more apertures such as those described above.

One or more of the first engaging region, second engaging region and joining region may have any deformation pattern that provides a required loading profile, and may include portions with different material properties.

The retaining member can be made of metal or plastic and the geometry and material properties are chosen to suit a desired loading that a specific application requires. The retaining member can be the main encapsulation for the stack, or in another embodiment it could be used only to deliver loads. The retaining member could: have a number of combined features or retaining components, be the external case, provide air or other fluid channeling, provide cooling thermal mass or retain a fixed geometry of the stack.

FIG. 5 illustrates an end view and an isometric view of a retaining member 500. The end view shows the retaining member 500 engaged with a fuel cell stack 502. The lateral direction of the retaining member 500 extends in the x dimension shown in FIG. 5. The longitudinal direction of the retaining member 500 extends in the y dimension shown in FIG. 5.

The engaging regions of the retaining member 500 are split up into three longitudinally disposed zones. A manifold zone 510 is located at each longitudinal end of the engaging regions and a cathode zone 512 is located in between the two manifold zones 510. As will be appreciated from the description that follows, each manifold zone 510 overlies a plenum at a fuel or other fluid inlet/outlet face of the fuel cell stack. Similarly, the cathode zone 512 overlies an active region of the fuel cell stack. In this example, the compressive force required for the manifold zones 510 is less than that required at the cathode zone 512. This represents one example in which a non-uniform loading profile can be advantageous. In some examples a non-uniform loading profile can enable each cell and area of the stack to perform effectively.

FIG. 6 illustrates a retaining member 600 engaged with a fuel cell stack 602. The retaining member 600 has a single longitudinally extending rib 604 on each engaging region. The ribs are in the vicinity of a midpoint (in a lateral direction) of the end faces of the fuel cell stack 602 in order to evenly distribute load. In examples with a plurality of ribs on an engaging region, such ribs may be symmetrically located either side the lateral midpoint of the end faces of the fuel cell stack.

As shown in FIG. 6, the longitudinal edges of the first and second engaging regions are spaced apart from the associated end faces of the stack 602. This can enable convenient access to the edges of the retaining member 600 so that it can be opened up and the fuel cell stack 602 removed.

In the example of FIG. 6 the ribs 604 provide the required geometry for spacing the longitudinal edges of the engaging regions apart from the stack 602. In other embodiments, ribs 604 are not necessarily required as the longitudinal edges may extend in a direction that is oblique to the plane of the end face of the fuel cell stack 602 in order to assist with fuel cell stack removal.

FIG. 7 illustrates a retaining member 700 engaged with a fuel cell stack 702. The retaining member 700 has detents 704 that retain the fuel cell stack 702 in position relative to the retaining member 700. In this example, each of the two engaging regions has two detents 704. Each detent 704 is in the vicinity of an edge between an end face and a side face of the fuel cell stack 702. The detents 704 shown extend in a direction generally orthogonal to the plane of the engaging regions and extend with the side faces of the fuel cell stack 702.

As shown in FIG. 7, the engaging regions may extend beyond the side face of the fuel cell stack 702 that is furthest from the joining region. This can provide convenient access for opening the retaining member 700 in order to remove the fuel cell stack 702.

Fitting some of the retaining members disclosed herein to a fuel cell stack may require an assembly fixture/tool. The assembly tool may be used to apply an external force to move the first engaging region away from the second engaging region against the biasing force applied by the joining region. Such an external force can increase the size of the opening at the open end of the C-shaped retaining member such that the fuel cell stack can pass through the opening in order to be located within the retaining member or removed from the retaining member. For example, the retaining member may be slid onto or dropped over the fuel cell stack at a desired orientation.

The compressive load that is required by the fuel cell stack will determine the necessary characteristics of the assembly.

As described above, the assembly fixture/tool may engage with longitudinal edges of the two engaging regions.

FIG. 8 illustrates a compression case 810 that can be placed around the fuel cell stack 802 before it is engaged by any retaining member disclosed herein. The compression case 810 comprises a frame 811 and a lid 812. The fuel cell stack 802 is located within the frame 810. The lid 812 is then attached to the frame 811 in order to provide an initial compression to the stack 802 and keep it together. The initial compression applied by the compression case 810 may be less than the working compression force that is to be applied by the retaining member.

FIG. 9 illustrates a side view, a front view and an isometric view of a fuel cell stack assembly 901 comprising a retaining member 900 and a fuel cell stack and numerous other optional features. In this example, the retaining member 900 defines a first fluid chamber 926 and two second fluid chambers 916 as described below.

The side view in FIG. 9 shows a retaining member 900 engaged with a stack 902. As described above, a cavity is defined by the joining region of the retaining member and a side face of the stack 902. This cavity will be referred to as a first fluid chamber 926. The side face is a ventilation face of the fuel cell stack such that the retaining member 900 defines the first fluid chamber 926 with the ventilation face. The ventilation face either receives air from, or provides air to, the fuel cell stack.

In this example, a printed circuit board (PCB) is mounted within the first fluid chamber 926. Such an arrangement can provide a compact assembly. Also, any air that passes through the first fluid chamber 926 can provide cooling to the PCB. Two lead wires 912 are shown connecting the PCB 912 to the stack 902.

In other embodiments the PCB 910 may be located within the fuel cell stack 900 or at an end of the retaining member 900, for example.

The front view in FIG. 9 is into the open end of the C-shaped retaining member 900. located at either end of retaining member 900 is a valve 914. As shown in both the front view and the isometric view, each of the valves 914 is in fluid communication with a respective second fluid chamber 916 adjacent a left and right end face 920, 922 of the fuel cell stack 902. The second fluid chambers 916 act as manifolds and define respective enclosed spaces between a valve 914 and an associated end face 920, 922 of the fuel cell stack. The left and right end faces 920, 922 are fuel communication faces of the fuel cell stack such that the retaining member 900 defines the second fluid chambers 916 with fuel communication faces of the fuel cell stack. The fuel communication faces of the fuel cell stack are transverse to the ventilation faces of the fuel cell stack.

In this example, the valve 914 shown on the left of the front view of FIG. 9 is an inlet valve used to control hydrogen flow to the associated second fluid chamber 916, from which it is provided to the fuel cells in the fuel cell stack 902. Similarly, the valve 914 shown on the right of the front view of FIG. 9 is an outlet valve that is used to control the removal of any hydrogen received from the fuel cell stack 902 at the associated second fluid chamber 916.

In some examples the valves 914 can control the hydrogen supply to be pulsed. The second fluid chambers 916 shown in FIG. 9 are quite large. It will be appreciated that in other embodiments the valves 914 are far smaller and can be fitted within the stack design/manifold region. The full system can be situated within the retaining member 900.

In applications where it is acceptable for any unused hydrogen to be provided directly to the environment, a valve 914 and second fluid chamber 916 for the hydrogen outlet may not be required.

In the example of FIG. 9, the orientation of the fuel cell stack 902 is such that air is required (either as oxidant or coolant, or both) to pass through the stack 902 from front to back or vice versa. That is, either into the page or out of the page for the front view shown in FIG. 9.

The isometric view of FIG. 9 shows two fans 924; one located at each end of the first fluid chamber 926 that runs along the length of the fuel cell stack 902. In some examples only one fan is required, in which case the other end of the air chamber may be closed off, optionally by a PCB for the fuel cell stack 902. The fan or fans 924 are used to pressurise or depressurise air within the first fluid chamber The fans 924 are laterally displaced relative to the second fluid chambers 916 and valves 914. (The lateral dimension is illustrated as the x direction in FIG. 5.) In this way, the second fluid chambers 916 and valves 914 are located adjacent to end faces of the fuel cell stack 902, and the fans 924 are located adjacent the first fluid chamber 916 that runs alongside the fuel cell stack in a longitudinal direction. (The longitudinal dimension is illustrated as the y direction in FIG. 5.)

The flow path of the hydrogen is of course kept separate to the air flow path through the first fluid chamber 916. For example, the fuel cell stack assembly may comprise a separation wall to separate the first fluid chamber from the second fluid chamber. The fans 924 can be used to provide such a separation wall.

As shown in the isometric view, apertures 918 may optionally be provided in the retaining member. Such apertures 918 may be for receiving pressurised air from a fan (not shown).

The retaining member may or may not be symmetrical. Areas of the retaining member can have required forms and features that improve usage of design space in a cost effective manner, whilst also being robust for production. An example of this is a fluid chamber that comprises fluid communication channels through the thickness of the retaining member. The fluid communication channels provide a fluid to, or receive a fluid from, the fuel cell stack through the retaining member. This may require surface properties for sealing and port holes which would not be required in the other areas. The load profile may need to be different in these areas, as can be provided by tuning the properties of the retaining member using any mechanism disclosed herein.

The fluid chamber may be encased within the retaining member. For example, it may run straight through a thickness of the retaining member in a direction that is transverse to a plane of the retaining member (it will be appreciated that such a plane may be a tangential plane in regions of the retaining member that are curved). Additionally or alternatively, the fluid chamber may extend in a direction that is parallel to a plane of the retaining member such that the fluid chamber is provided as a gallery within outer surfaces of the retaining member.

As will be appreciated from FIG. 9, one or more of the embodiments disclosed herein can provide a means for hybridising functionality of other components into the casing, thereby opening opportunities for improved layouts of stack design. Such other functionality includes providing and/or removing air as coolant and/or oxidant, providing fuel, removing unused fuel, providing additional cooling, accommodating PCBs, etc.

Figure 10:
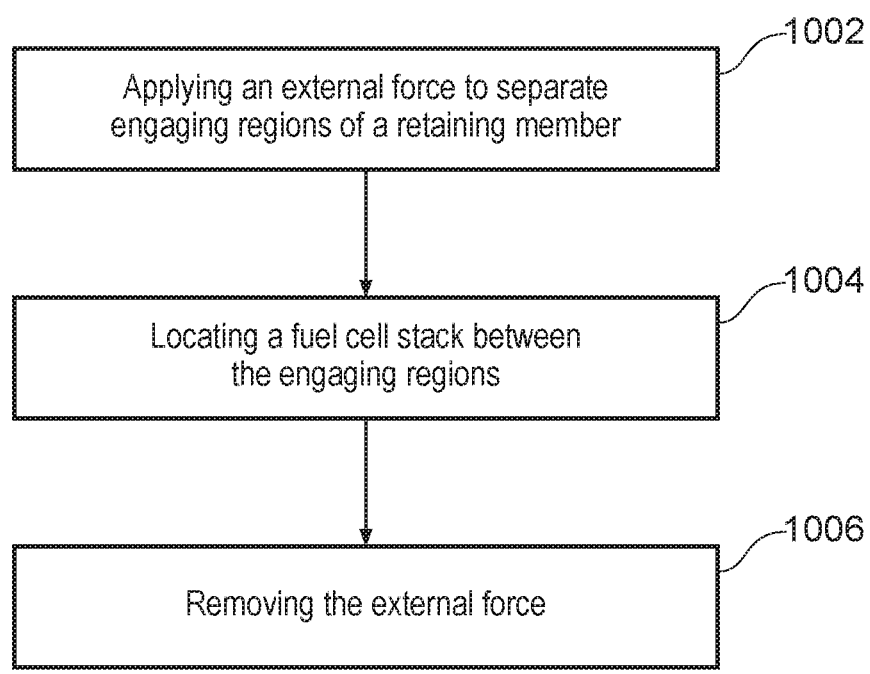
FIG. 10 illustrates a method of assembling a fuel cell assembly.

FIG. 10 illustrates a method of assembling a fuel cell assembly comprising a fuel cell stack and any retaining member disclosed herein.

At step 1002, the method comprises applying an external force to move a first engaging region away from a second engaging region against a bias applied by a joining region. The external force can be applied by an assembly tool that can engage with the first and/or second engaging regions. Alternatively, the external force can be applied by the end surfaces of the fuel cell stack as it is pushed between the two engaging regions. That is, one or both of the engaging regions may have an oblique surface that causes the first engaging region to move away from the second region as the fuel cell stack is pushed against the oblique surface.

At step 1004, the method continues by locating the fuel cell stack between the first engaging region and the second engaging region such that the first engaging region and second engaging region extend to or beyond the midpoint of associated end faces of the fuel cell stack. The previous or concurrent step of moving the engaging regions away from each other defines an opening through which the fuel cell stack is passed so that it can be located between the engaging regions.

At step 1006, the method in this example concludes by removing the external force such that the first engaging region engages a first end face of the fuel cell stack and the second engaging region engages a second opposing end face of the fuel cell stack. In this way, the retaining member applies a required compression force to the fuel cell stack.

Such a method can be simplified when compared with the prior art and can be cost effective and convenient for mass production.

Figure 11:
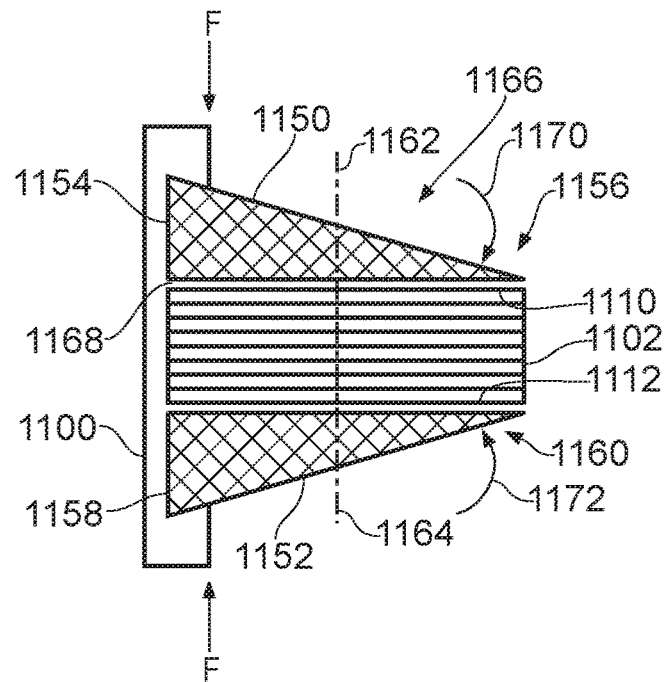
FIG. 11 shows a side view of another fuel cell stack assembly.

FIG. 11 shows a side view of another fuel cell stack assembly that includes a retaining member 1100 and a fuel cell stack 1102. It will be appreciated that the scale of FIG. 11 has been exaggerated for ease of illustration. The fuel cell stack 1102 defines a first end face 1110 and a second end face 1112 that are parallel and opposing one another.

The fuel cell stack assembly also includes a first compression member 1150 at the first end face 1110 of the fuel cell stack 1102 and a second compression member 1152 at the second end face 1112 of the fuel cell stack 1102. The compression members 1150, 1152 may be end plates of the fuel cell stack 1102. Each compression member 1150, 1152 has a proximal portion 1154, 1158 closest to the retaining member 1100 and a distal portion 1156, 1160 furthest from the retaining member 1100. In some examples, the proximal portion 1154, 1158 may be considered as any part of the compression member 1150, 1152 that is nearer to the retaining member than a midpoint 1162, 1164 of the compression member 1150, 1152. Similarly, the distal portion 1156, 1160 may be considered as any part of the compression member 1150, 1152 that is beyond the midpoint 1162, 1164 of the compression member 1150, 1152.

Each compression member 1150, 1152 defines an engagement surface 1166 for receiving a compression force (F). In this example the compression force (F) is provided to both compression members 1150, 1152 by a single retaining member 1100. For example, the retaining member may have two engaging regions that are biased towards each other in order to maintain the fuel cells in the stack under compression in the same way as described above. The compression members 1150, 1152 also each define a compression surface 1168, which is opposite to the engagement surface 1166. The compression surface 1168 and engagement surface 1168 are not necessarily parallel. The compression surface 1168 is adjacent to and in compressive relationship with a respective one of the first and second end faces 1110, 1112 of the stack 1120.

In this example, both of the compression members 1150, 1152 are shaped such that a compression force (F) applied only to the proximal portion 1154, 1158 of the engagement surface 1166 is distributed uniformly across the compression surface 1168 in both the proximal and distal portions of the compression members 1150, 1152.

In this way, the shape of one or both of the compression members 1150, 1152 can be set such that the retaining member 1100 does not necessarily need to extend to or beyond the midpoint 1162, 1164 of the compression member 1150, 1152 yet can still be used to provide an evenly distributed compression force to the fuel cell stack 1102. This can be advantageous for increasing the surface area that is available for accessing the stack 1102.

In the example of FIG. 11, at the contact portion on the engagement surface 1166 that receives the compression force (F) from the retaining member 1100, the engagement surface 1166 tends towards the compression surface 1168 as the two surfaces 1166, 1168 extend from the proximal portion 1154 to the distal portion 1156 of the compression member 1150. In this way, the engagement surface 1166 is obliquely angled relative to the compression surface 1168 such that the compression force (F) exerts a force on the compression member 1150 that has: i) a first component in the plane of the end face 1110 of the fuel cell stack 1102; and ii) a second component perpendicular to the plane of the end face 1110 of the fuel cell stack 1102. The result of the first and second components of the force between the compression member 1150 and the fuel cell stack 1102 is a rotational force (moment) that acts in a clockwise direction 1170 on the upper compression member 1150 shown in FIG. 11. Similarly, a rotational force (moment) that acts in an anti-clockwise direction 1170 is applied to the lower compression member 1152 shown in FIG. 11. That is, the compression force causes a lateral force to be applied to the compression member 1150 at the compression surface 1168, thereby resulting in a rotational force. These rotational forces enable the compression force to be spread across the compression surface 1168 beyond the mid-point 1162 of the compression member 1150.

It will be appreciated that the engagement surface 1166 of the upper compression member 1150 may be defined as only the part of the upper surface that engages with the retaining member 1100, not necessarily the entire upper surface, in order to provide the desired distribution of force across the compression surface 1168. That is, the engagement surface may be defined as a contact portion of the compression member that receives the compression force (F).

The compression members 1150, 1152 of FIG. 11 are wedge-shaped with a thick end closest to the retaining member 1100. The compression members 1150, 1152 are shaped such that the distance between the engagement surface 1166 and the compression surface 1168 is greater in the proximal portion 1154 than in the distal portion 1156 of the compression member 1150, 1152.

Figure 12:
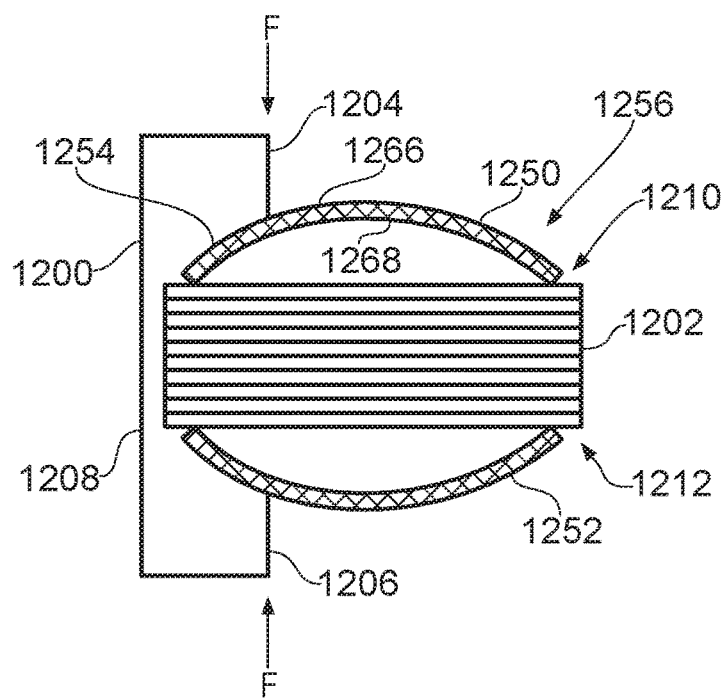
FIG. 12 shows a side view of yet another fuel cell stack assembly.

FIG. 12 shows a side view of another fuel cell stack assembly that includes a retaining member 1200 and a fuel cell stack 1202. FIG. 12 shows the fuel cell stack assembly in an unloaded condition. It will be appreciated that the scale of FIG. 12 has been exaggerated for ease of illustration. The fuel cell stack 1202 defines a first end face 1210 and a second end face 1212 that are parallel and opposing one another.

The fuel cell stack assembly also includes a first compression member 1250 at the first end face 1210 of the fuel cell stack 1202 and a second compression member 1252 at the second end face 1212 of the fuel cell stack 1202. In the same way as FIG. 11, each compression member 1250, 1252 has a proximal portion 1254 and a distal portion 1256, and each compression member 1250, 1252 defines an engagement surface 1266 for receiving a compression force (F) and a compression surface 1268 adjacent to and in compressive relationship with the first end face 1210 of the fuel cell stack 1202.

In this example, the compression members are preformed elements 1250, 1252 such that a compression force (F) that is applied only to the proximal portion 1254 of the engagement surface 1266 is distributed uniformly across the compression surface 1268 in both the proximal and distal portions 1254, 1256.

The preformed elements 1250, 1252 are configured with a predetermined curvature such that the compression surface 1268 is a concave surface when the preformed element 1250, 1252 is not under load (as shown in FIG. 12). Under the application of the compression force (F) to maintain the fuel cells under compression, flexure of the preformed element 1250, 1252 causes the compression surface 1268 to become a substantially planar surface. In this way, the compression force (F) is spread out across the compression surface 1268, including at regions that are beyond the midpoint of the compression member 1250.

The engagement surface 1256 of the compression member 1250 of FIG. 12 is configured with a predetermined curvature such that the engagement surface 1256 is a convex surface when the preformed element is not under load (as shown in FIG. 12). Under the application of the compression force (F) to maintain the fuel cells under compression, flexure of the preformed element causes the engagement surface to become a substantially planar surface.

In the example of FIG. 12, the retaining member 1200 engages the preformed element 1250, 1252 at a position that corresponds to a concave portion of the compression surface, although this need not necessarily be the case.

The retaining member 1200 comprises a first engaging region 1204 that engages the proximal portion 1254 of the first compression member 1250, and a second engaging region 1206 that engages the proximal portion of the second compression member 1252. The retaining member 1200 also includes a joining region 1208 that is configured to bias the first engaging region 1204 towards the second engaging region 1206 in order to apply the compression force and maintain the fuel cells in the stack 1202 compression. In this example, the joining region 1208 extends around the outside of the first and second compression members 1250, 1252

It will be appreciated that the retaining member of FIG. 11 can be provided in a similar way to that of FIG. 12.

Figure 13:
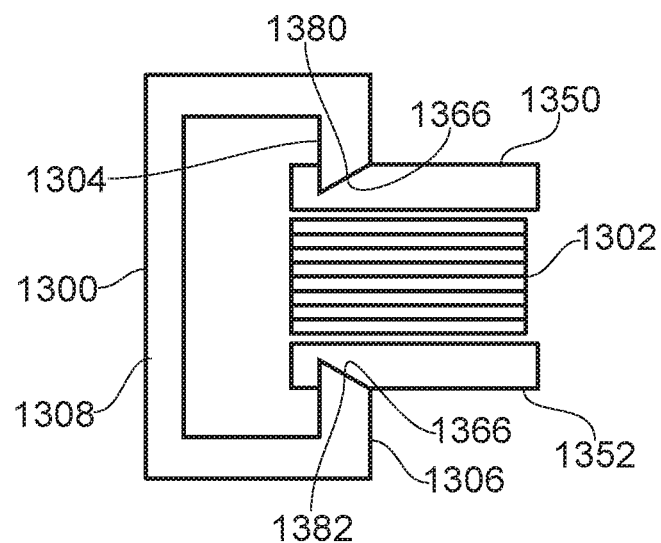
FIG. 13 shows a side view of further fuel cell stack assembly.

FIG. 13 shows a side view of a further fuel cell stack assembly that includes a retaining member 1300 and a fuel cell stack 1302. It will be appreciated that the scale of FIG. 13 has been exaggerated for ease of illustration.

The fuel cell stack assembly also includes a first compression member 1350 at the first end face of the fuel cell stack 1302 and a second compression member 1352 at the second end face of the fuel cell stack 1302. As above, the compression members 1350, 1352 may be end plates of the fuel cell stack 1302.

Each compression member 1350, 1352 defines an engagement surface 1366 for receiving a compression force from the retaining member 1300. The compression members 1350, 1352 also each define a compression surface, which is opposite to the engagement surface 1366.

The retaining member 1300 has two engaging regions 1304, 1306 that are biased towards each other in order to maintain the fuel cells in the stack under compression in the same way as described above. The surfaces of the engaging regions 1304, 1306 that make contact with the compression members 1350, 1352 will be referred to as engaging surfaces 1380, 1382.

In this example, the engaging surfaces 1380, 1382 of the two engaging regions 1304, 1306 are in planes that diverge as they extend away from a joining region 1308 of the retaining member 1300. The planes may diverge relative to each other, the compression surfaces of the compression members 1350, 1352; and/or the fuel cells in the fuel cell stack 1302. The engagement surfaces 1366 of the compression members 1350, 1352 may also be similarly divergent when the compression members 1350, 1352 are at rest. Alternatively, the compression members 1350, 1352 may be deformable such that the engagement surfaces 1366 are not parallel with the engaging surfaces 1380, 1382 when the retaining member 1300 is not coupled to the compression members 1350, 1352, but are parallel when the fuel cell stack assembly is assembled. For example, when the compression member is at rest the engagement surfaces 1366 may be generally parallel with one or more of: each other, the compression surfaces of the compression members 1350, 1352; and the fuel cells in the fuel cell stack 1302.

It will be appreciated that any geometry of the engaging surfaces 1380, 1382 of the retaining member 1300 and the engagement surfaces 1366 of the compression members 1350, 1352 can be used such that a compression force that is applied only to a proximal portion of the compression members 1350, 1352 can be distributed uniformly across the compression surface of the compression members 1350, 1352. That is, components of the compression force can be spread evenly across the compression surface of the compression members, even though the compression force is received at a proximal portion of the compression members 1350, 1352.

Figure 14:
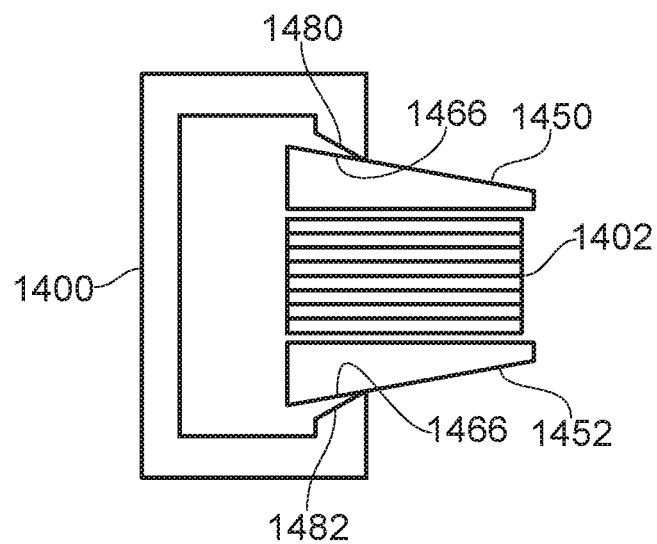
FIG. 14 shows a side view of yet further fuel cell stack assembly.

FIG. 14 shows a side view of a yet further fuel cell stack assembly that includes a retaining member 1400 and a fuel cell stack 1402. It will be appreciated that the scale of FIG. 14 has been exaggerated for ease of illustration.

As with examples described above, the fuel cell stack assembly includes a first compression member 1450 and a second compression member 1452 at opposing end faces of the fuel cell stack 1402.

Each compression member 1450, 1452 defines an engagement surface 1466 for receiving a compression force from the retaining member 1400, as well as an opposing compression surface. As with FIG. 13, the retaining member 1400 of FIG. 14 has two engaging regions that each defines an engaging surface 1480, 1482.

In this example, the engaging surfaces 1480, 1482 of the two engaging regions are in planes that converge as they extend away from a joining region of the retaining member 1400. The planes may converge relative to each other, the compression surfaces of the compression members 1450, 1452; and/or the fuel cells in the fuel cell stack 1402. The engagement surfaces 1466 of the compression members 1450, 1452 are also in planes that are convergent.

It can be seen in FIG. 14 that the planes of the engaging surfaces 1480, 1482 of the two engaging regions converge quicker than the planes of the engagement surfaces 1466 of the compression members 1450, 1452. That is, the angle between the plane of an engaging surface 1480, 1482 of an engaging region and the plane of the fuel cells in the fuel cell stack is greater than the angle between the plane of an engagement surface 1466 of a compression member and the plane of the fuel cells in the fuel cell stack. The plane of an engaging surface 1480, 1482 of an engaging region is obliquely angled relative to the plane of an engagement surface 1466 of a compression member 1450, 1452.

In this way, the geometry of the engaging surfaces 1480, 1482 of the retaining member 1400 relative to the engagement surfaces 1366 of the compression members 1450, 1452 can be set such that a compression force that is applied only to a proximal portion of the compression members 1450, 1452 can be distributed uniformly across the compression surface of the compression members 1450, 1452. Such distribution can utilise rotational forces that are created due to the engagement between the retaining member 1400 and the compression members 1450, 1452

For at least the examples of FIGS. 13 and 14, each of the engaging surfaces of the retaining member may be fixedly connected to the engagement surface of the corresponding compression member. For example, the two surfaces may be welded together or affixed by adhesive. In other examples, the two surfaces may be held together by the compressive force that is applied by the retaining member.

It will be appreciated that the engaging surfaces of the retaining member and the engagement surface of the corresponding compression member may be in any planes (either at rest, or in use) that enable a compression force applied at a proximal region of the compression members to be uniformly spread across the compression member. For example, the surfaces may be convergent or divergent, at the same or different angles relative to the plane of the compression surface. The contact points between the retaining member and the compression members can be shaped to counter the rotation forces from the stack, which have been generated through being pinched at one end. In some examples, lateral forces may be applied by a joining region of the retaining member that has a preformed curvature in order to achieve the uniform distribution of forces.

The fuel cell stack may comprise one or a plurality of fuel cells. The retaining members disclosed herein can be modular; the same design principle can be used to clamp one or a plurality of cells. Furthermore, the retaining members can be considered as modular because in some embodiments a plurality of retaining members may by engaged with a single fuel cell stack. The retaining members may be spaced apart along the longitudinal length of the fuel cell stack, and may all be engaged from the same side of the fuel cell stack or may be engaged from opposite sides of the fuel cell stack. This may be particularly beneficial for applying an increased clamping force to any valves associated with the fuel cell stack. In some examples, the retaining members may be provided by wires.

Embodiments disclosed herein enable a fuel cell stack assembly to be constructed to a desired load instead of a set height. As applications for smaller stacks become increasingly important, materials with a thinner gauge material become particularly advantageous. However, if a fuel cell stack assembly is built to a set height, an overload may need to be applied to ensure that a sufficient compression force is applied to the fuel cell stack for all variations of the fuel cell stack dimensions that are within the tolerances of construction. Such overloading can cause buckling of thin components thereby compromising performance of the fuel cell stack. Therefore, retaining members disclosed herein that enable a fuel cell stack assembly to be built to load instead of height can reduce these problems.

It will be appreciated that the retaining member may extend in a direction that is transverse to the direction of air flow through the fuel cell stack (as shown in FIG. 1) or may extend in a direction that is parallel to the direction of air flow through the fuel cell stack.

The features or functionality of any example disclosed herein can be provided with other examples disclosed herein.

The invention claimed is:

1. A fuel cell stack assembly comprising:
a fuel cell stack having one or more fuel cells; and
a retaining member with:
   a first engaging region that engages a first end face of the fuel cell stack;
   a second engaging region that engages a second opposing end face of the fuel cell stack; and
   a joining region configured to bias the first engaging region towards the second engaging region,
wherein the retaining member defines a fluid chamber for communicating a fluid to or from the fuel cell stack;
wherein the retaining member defines:
   a first fluid chamber for communicating air to or from the fuel cell stack; and
   a second fluid chamber for communicating fuel to or from the fuel cell stack;
wherein the assembly further comprises a valve configured to control hydrogen flow to or from the second fluid chamber.

2. The fuel cell stack assembly of claim 1, wherein the fluid is fuel or water.

3. The fuel cell stack assembly of claim 1, wherein the retaining member extends in a direction that is parallel to the direction of air flow through the fuel cell stack.

4. The fuel cell stack assembly of claim 1, wherein the fluid chamber is encased within the retaining member.

5. The fuel cell stack assembly of claim 4, wherein the fluid chamber extends in a direction that is parallel to a plane of the retaining member such that the fluid chamber is provided as a gallery within outer surfaces of the retaining member.

6. The fuel cell stack assembly of claim 1, wherein the retaining member is configured to define the first fluid chamber with a ventilation face of the fuel cell stack, and define the second fluid chamber with a fuel communication face of the fuel cell stack.

7. The fuel cell stack assembly of claim 6, wherein the ventilation face of the fuel cell stack is transverse to the fuel communication face of the fuel cell stack.

8. The fuel cell stack assembly claim 1, wherein the fuel cell stack assembly comprises a separation wall to separate the first fluid chamber from the second fluid chamber.

9. The fuel cell stack assembly of claim 8, further comprising a fan configured to pressurise or depressurise air within the first fluid chamber and also provide the separation wall to separate the first fluid chamber from the second fluid chamber.

10. The fuel cell stack assembly of claim 1, wherein the fluid chamber is configured to provide fluid into the fuel cell stack and/or remove fluid out of the fuel cell stack.

11. The fuel cell stack assembly of claim 1, wherein the fuel cell stack comprises a fluid conduit for transporting fluid through the fuel cell stack, and wherein the retaining member defines the fluid chamber for communicating a fluid to or from the fluid conduit of the fuel cell stack.

12. The fuel cell stack assembly of claim 1, wherein the first engaging region and second engaging region extend to or beyond a midpoint of the associated end faces of the fuel cell stack.

13. A fuel cell stack assembly comprising:
a fuel cell stack having one or more fuel cells; and
a retaining member with:
    a first engaging region that engages a first end face of the fuel cell stack;
    a second engaging region that engages a second opposing end face of the fuel cell stack; and
    a joining region configured to bias the first engaging region towards the second engaging region;
wherein the first engaging region and second engaging region extend to or beyond a midpoint of the associated end faces of the fuel cell stack; and
wherein the first engaging region and/or second engaging regions comprise an end plate of the fuel cell stack.

14. The fuel cell stack assembly of claim 13, wherein the joining region is configured to at least partly define a fluid chamber with a side face of the fuel cell stack.

15. The fuel cell stack assembly of claim 14, further comprising a fan configured to provide fluid to or extract fluid from the fluid chamber.

16. The fuel cell stack assembly of claim 13, wherein the first engaging region and the second engaging region are configured to provide a uniform loading profile to the first and second end faces of the fuel cell stack.

17. The fuel cell stack assembly of claim 13, wherein the first engaging region and/or the second engaging region comprise at least one of:
    one or more ribs extending away from an inner surface of the engaging region;
    one or more grooves extending into an inner surface of the engaging region;
    portions with different thicknesses from one another;
    portions of different materials from one another;
    portions with different material properties;
    one or more apertures; and
    a deformation pattern.

18. The fuel cell stack assembly of claim 13, wherein the first engaging region and/or the second engaging region comprise one or more detents configured to retain the fuel cell stack in position relative to the retaining member.

19. A method of assembling a fuel cell stack assembly,
the fuel cell stack assembly comprising:
    a fuel cell stack having one or more fuel cells, a first end face and an opposing second end face; and
    a retaining member with:
        a first engaging region,
        a second engaging region and
        a joining region configured to bias the first engaging region towards the second engaging region,
    wherein the first engaging region and/or second engaging regions comprise an end plate of the fuel cell stack;
the method comprising:
    applying an external force to move the first engaging region away from the second engaging region against the bias applied by the joining region;
    locating the fuel cell stack between the first engaging region and the second engaging region such that the first engaging region and second engaging region extend to or beyond a midpoint of the associated end faces of the fuel cell stack; and
    removing the external force such that the first engaging region and the second engaging region engage the associated end faces of the fuel cell stack.

* * * * *